United States Patent
Tanioka et al.

(10) Patent No.: US 6,623,913 B2
(45) Date of Patent: Sep. 23, 2003

(54) METHOD FOR PRODUCING LIQUID CRYSTAL DISPLAY DEVICE

(75) Inventors: Satoshi Tanioka, Chiba (JP); Shizuo Murata, Chiba (JP); Makoto Kono, Nagano (JP); Masayuki Hirano, Shizuoka (JP)

(73) Assignees: Chisso Corporation, Osaka (JP); IInuma Gauge Manufacturing Company Limited, Chino (JP); Hamamatsu Photonics Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/964,660

(22) Filed: Sep. 28, 2001

(65) Prior Publication Data
US 2002/0018966 A1 Feb. 14, 2002

Related U.S. Application Data

(62) Division of application No. 09/284,750, filed as application No. PCT/JP98/03713 on Aug. 21, 1998, now Pat. No. 6,322,956.

(30) Foreign Application Priority Data

Aug. 22, 1997 (JP) ............................................. 9-226495

(51) Int. Cl.$^7$ ............................................. G02F 1/1337
(52) U.S. Cl. ...................... 430/321; 430/967; 427/595; 349/187
(58) Field of Search ................................ 430/321, 347, 430/966, 967; 427/551, 552, 595, 496; 349/187

(56) References Cited

U.S. PATENT DOCUMENTS

| 5,625,475 A | * | 4/1997 | Tanioka et al. | ............. | 339/123 |
| 5,750,011 A | * | 5/1998 | Ohmi et al. | ................ | 204/164 |

FOREIGN PATENT DOCUMENTS

| JP | 1-065254 | 3/1989 |
| JP | 2-2515 | 1/1990 |
| JP | 2-2525 | 1/1990 |
| JP | 7-294928 | 11/1995 |
| JP | 8-45695 | 2/1996 |
| JP | 8-45884 | 2/1996 |
| JP | 8-50293 | 2/1996 |
| JP | 8-124695 | 5/1996 |
| JP | 8-211622 | 8/1996 |

* cited by examiner

Primary Examiner—John A. McPherson
(74) Attorney, Agent, or Firm—Wenderoth, Lind & Ponack, L.L.P.

(57) ABSTRACT

Disclosed is a method for producing liquid crystal display devices comprising a step for forming a transparent electrode and a circuit element of semiconductor on the surface of a pair of transparent substrates, and various steps for applying a photoresist, exposing to the light, etching, releasing the photoresist, inspecting the electrodes and circuit elements of semiconductor, forming an insulating film, forming an alignment film, rubbing the alignment film, spreading spacers, applying a sealing agent, fabricating a cell, filling a liquid crystal, pasting a polarizing plate, and connecting a driver IC characterized in that a soft X-ray is irradiated to the substrate in at least one step prior to the rubbing of the alignment films to produce liquid crystal display devices, at a high yield, in which devices number of pixel defect is small.

5 Claims, 6 Drawing Sheets

METHOD FOR PRODUCING LIQUID CRYSTAL DISPLAY DEVICE

This is a divisional application of Ser. No. 09/284,750, now U.S. Pat. No. 6,322,956, filed Apr. 20, 1999 which is a 371 of PCT/JP98/03713 filed Aug. 21, 1998.

TECHNICAL FIELD

The present invention relates to thin film coating apparatuses, methods for coating a thin film, and methods for producing liquid crystal display devices employing a soft X-ray, and liquid crystal display devices produced by the methods.

BACKGROUND ART

Liquid crystal display devices are actively introduced in the field of such OA (office automation) instruments as personal computers and word processors since the display devices can be driven at a low voltage, are light in weight, and provide a high image quality. As the liquid crystal display devices used in these applications, devices of twisted nematic mode in which the direction of alignment of nematic liquid crystal molecules is twisted by 90° between the surface of a pair of upper and lower electrode substrates are generally employed. Liquid crystal display devices in which twist angle of liquid crystal molecules is increased to such a large angle as 180° to 300° are known as super twisted nematic mode. Besides, in order to perform matrix display or color display, development of liquid crystal display devices of active matrix type twisted nematic mode using a MIM (metal-insulating layer-metal) circuit element by which ON-OFF of a large number of pixel electrodes can be performed or using a TFT (field effect type thin film transistor) circuit element became active in recent years.

In Laid-open Japanese Patent Publication No. Hei 2-2525, a technology is disclosed in which parallel X-rays are irradiated to a substrate on the surface of which a X-ray resist layer is provided, and then the substrate is immersed in a developer and a rinse to increase the pretilt angle of liquid crystal molecules to be formed on the surface of the substrate. According to the technology disclosed in the publication, an X-ray resist layer is exposed to X-rays and immersed in a developer and a rinse to form microscopic projections and depressions on the surface of the X-ray resist layer thereby to align the liquid crystal molecules.

In Laid-open Japanese Patent Publication No. Hei 8-211622, an example of apparatuses for coating a thin film employing the effect of destaticizing with a soft X-ray is disclosed.

On the other hand, in Laid-open Japanese Patent Publication Nos. Hei 8-45695 and Hei 8-124695, static eliminating apparatuses using a soft X-ray are disclosed. Apparatuses disclosed in these publications are principally to blow the air which is ionized with a soft X-ray, to objects.

In Laid-open Japanese Patent Publication No. Hei 8-50293, which was published based on an application filed a few years ago by the present inventors, methods for producing liquid crystal display devices comprising irradiating a soft X-ray to an alignment film in a gas after a rubbing treatment are disclosed. More specifically speaking, in the publication, a technology is shown in which a soft X-ray is irradiated to an alignment film activated by a rubbing treatment, to reduce the surface energy of the alignment film thereby to prevent uneven displays from occurring in liquid crystal display devices.

Since it has entered upon a period of multi-media and many letter displays and diagrammatic displays have been sought, liquid crystal display devices are inevitably proceeding toward expanded screen size, large number of pixels, and fine displays. In keeping with such circumstances, production yield of liquid crystal display devices is on the trend of being lowered to some extent. As the factors which affect the lowering of production yield, occurrence of such uneven displays that regions having a different contrast or different chromaticity appear in a part of a screen, and happening of pixel defects such as a white defect in which the pixel becomes rid of light at the time of black display and a black defect in which the pixel does not transmit the light at the time of white display can be mentioned.

In the steps for producing liquid crystal display devices, many particles such as the so-called dusts, reaction products, and broken pieces of the substrates or surrounding materials are considered to occur. The particles slip into liquid crystal display devices and become a principal cause of the uneven displays and pixel defects described above. With the advance of cleaning technology, large particles have come to be seldom slipped into the devices. However, it is still difficult to completely remove extremely fine particles such as fatty acids generated from human bodies.

Recently, in order to remove the extremely fine particles, dry washing treatments using a nozzle capable of jetting air in such a way as performed with wipers, and wet washing treatments using pure water or an organic solvent are being used. However, it is difficult to completely remove the extremely fine particles by the dry washing treatments. With the wet washing treatments, it is pointed out that an extremely small amount of impurities are included even in washing liquids, and it is also difficult to completely remove the impurities.

On the other hand, it is known that such an extremely high static electricity as 6 to 10 keV is generated in the steps for producing liquid crystal panels, particularly at the time of conveying glass substrates, or in a thin film coating step or the like. As the result, the particles come to readily adhere on the substrates by the generated static electricity, and this fact has become a leading cause of lowering the production yield of liquid crystal display devices. In connection with the static electricity, whereas a method wherein a humidifier is used to increase humidity up to 60 to 70%, or a method wherein an ion generating apparatus is installed is being used to cope with the adhering of particles described above, such methods are still insufficient. As detrimental effects by the static electricity, disconnection or short-circuit of electrodes due to electrostatic breakdown, malfunctioning of active devices, and the like can be mentioned.

As described above, in order to increase the yield in the production of liquid crystal display devices, it is important to reduce the number of particles in production facilities, to repress the adhering of particles to substrates caused by static electricity, and to remove the adhered particles by washing. However, according to conventional methods, it was difficult to fundamentally solve the problems.

In the steps for coating or forming such a thin film as a photoresist, insulating film, and alignment film, it is difficult to remove, even by washing treatments, the particles which were adhered on the surface of a substrate in the steps of coating, evaporating, and drying, since the solvent is evaporated and the film thus formed is dried in the steps after a liquid having a flowability was applied on the surface of the substrate; and the difficulty has become a particularly serious problem.

SUMMARY OF THE INVENTION

An object of the present invention is to improve such defects in the prior art as described above; to provide apparatuses and methods for coating a thin film which apparatuses and methods are efficient for eliminating the static electricity generated in the steps for producing liquid crystal display devices; to provide methods wherein the static electricity generated in the steps for producing liquid crystal display devices is efficiently eliminated to increase the production yield; and to provide liquid crystal display devices produced by such methods.

In Laid-open Japanese Patent Publication No. Hei 8-50293 mentioned above, a technology in which a soft X-ray is irradiated to the surface of a substrate after rubbing treatment is disclosed. However, as a result of diligent studies by the present inventors, it has been discovered that uneven displays can efficiently be prevented from occurring by irradiating a soft X-ray on the surface of a substrate in a step prior to a rubbing treatment in the processes for producing liquid crystal display devices, leading to the accomplishment of the present invention.

The present invention is summarized as follows:

(1) A thin film coating apparatus comprising a substrate moving portion capable of moving a substrate in the apparatus, a coating portion for forming a thin film on the substrate, and a soft X-ray irradiating portion for emitting a soft X-ray to the substrate in the substrate moving portion or substrate coating portion.
(2) The thin film coating apparatus described in (1) above wherein the energy of the soft X-ray in the soft X-ray irradiating portion is 4 to 9.5 keV.
(3) The thin film coating apparatus described in (1) above wherein the distance from the substrate to the source of the soft X-ray is shorter than 1500 mm.
(4) The thin film coating apparatus described in (1) above wherein the soft X-ray irradiating portion comprises a first and a second soft X-ray irradiating portions capable of emitting a soft X-ray to the substrate in a location at the front and back of the coating portion, respectively.
(5) The thin film coating apparatus described in (1) above wherein the thin film is a photoresist film.
(6) The thin film coating apparatus described in (1) above wherein the thin film is an insulating film.
(7) The thin film coating apparatus described in (1) above wherein the thin film is an alignment film.
(8) A method for coating a thin film comprising using the thin film coating apparatus described in (1) above, setting a substrate in a substrate moving portion, and forming a thin film on the substrate in a coating portion.
(9) The method for coating a thin film described in (8) above wherein the thin film is a photoresist film.
(10) The method for coating a thin film described in (8) above wherein the thin film is an insulating film.
(11) The method for coating a thin film described in (8) above wherein the thin film is an alignment film.
(12) In a method for producing a liquid crystal display device comprising a step for forming a transparent electrode and a circuit element of semiconductor on the surface of a pair of transparent substrates, a step for applying a photoresist on the surface of the substrates according to a predetermined pattern, a step for exposing the photoresist applied on the substrates to the light, a step for subjecting the substrates to an etching treatment, a step for releasing the photoresist from the substrates, a step for inspecting the transparent electrodes and circuit elements of semiconductor, a step for forming an insulating film on the substrates, a step for forming an alignment film on the substrates, a step for rubbing the alignment film formed on the substrate, a step for spreading spacers on the substrate, a step for applying a sealing agent on the substrate, a step for piling up the substrates, a step for providing a gap of predetermined thickness between the substrates, a step for cutting the substrates into predetermined size of substrates, a step for filling a liquid crystal material in the gap, a step for pasting a polarizing plate to the substrate, and a step for connecting a driver IC to the transparent electrodes, the improvement which comprises irradiating a soft X-ray to the substrate in a gas in at least one step prior to the step for rubbing the alignment film.
(13) The method for producing a liquid crystal display device described in (12) above wherein the irradiating energy of the soft X-ray is 4 to 9.5 keV.
(14) The method for producing a liquid crystal display device described in (12) above wherein the distance from the substrate to the source of the soft X-ray is shorter than 1500 mm.
(15) A liquid crystal display device produced by the method described in (12) above.
(16) The liquid crystal display device described in (15) above wherein the liquid crystal material is a mixture comprising at least one compound expressed by the general formula (2) or (3)

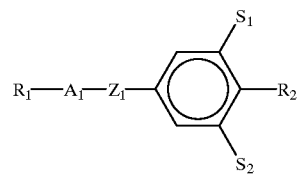

(2)

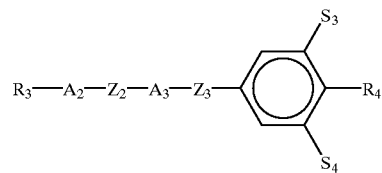

(3)

wherein $R_1$ and $R_3$ independently represent a straight chain alkyl group having 1 to 10 carbon atoms or an alkenyl group having 2 to 10 carbon atoms; $R_2$ and $R_4$ independently represent a straight chain alkyl group or alkyloxy group having 1 to 10 carbon atoms, —CN, fluorine atom, chlorine atom, —$CF_3$, —$CHF_2$, —$OCF_3$, or —$OCHF_2$; $S_1$, $S_2$, $S_3$, and $S_4$ independently represent hydrogen atom, fluorine atom, chlorine atom, —$CF_3$, —$CHF_2$, —$OCF_3$, or —$OCHF_2$; $Z_1$, $Z_2$, and $Z_3$ independently represent —COO—, —$CH_2CH_2$—, —C≡C—, or single bond; and $A_1$, $A_2$, and $A_3$ independently represent

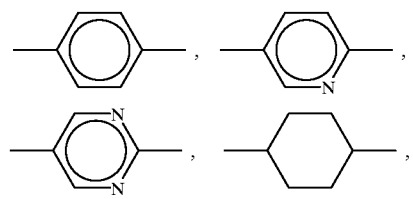

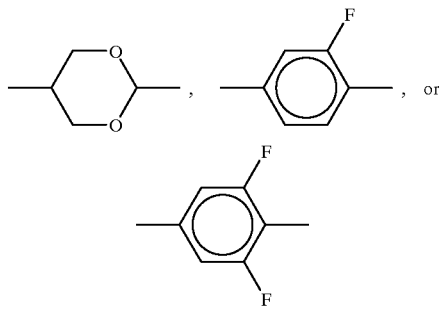

Thin film coating apparatuses of the present invention are characterized by having a substrate moving portion which is capable of moving or shifting a substrate in the apparatuses, a coating portion for forming a thin film on the substrate, and a soft X-ray irradiating portion for emitting a soft X-ray to the substrate in the substrate moving portion or substrate coating portion.

Basic principle of the present invention is that the static electricity generated in the step for coating or forming a thin film can readily and efficiently be eliminated by the adsorption, on the substrate, of the gaseous ions generated by ionization of a soft X-ray having a large wave length, and adherence of particles on the coated surface and static breakdown can be prevented by the static erasing effect to increase the yield of products.

Soft X-ray irradiating apparatuses used in the present invention are not specifically restricted so far as they can stably control their output in the range of 4 to 9.5 keV in terms of the energy of a soft X-ray. Irradiation time of the soft X-ray is not specifically restricted, either. However, it is usually 0.5 second or longer and preferably 2 to 300 seconds. When the irradiating time is shorter than 0.5 second, the effects by the soft X-ray irradiation is small. While the distance through which the soft X-ray is irradiated is not specifically restricted, the distance is usually adjusted to shorter than 1500 mm and preferably from 10 to 400 mm.

Soft X-ray irradiating apparatuses used in the present invention can be used with being loaded on a spin coat type photoresist coating apparatus, insulating film coating apparatus, or alignment film coating apparatus provided with (a) a solution supplying means which is referred to as a dispenser and allows a coating solution to fall in drops on the surface of a transparent substrate having a predetermined electrode formed on one side thereof and (b) a rotatable stage for flattening, by centrifugal force, the coating solution which was allowed to fall on the surface of the transparent substrate.

In the present invention, the atmosphere in which a soft X-ray is irradiated is not restricted at all so long as it is a gas. As preferable gases, air, nitrogen gas, carbon dioxide gas, water vapor, helium, neon, argon, a mixed gas of at least one of them with oxygen, and a mixed gas thereof can be mentioned.

Soft X-ray used in the present invention is extremely weak in its capability of passing through a substance since its energy is low. The capability is in a level at which passing of the soft X-ray can readily be shielded with a transparent polyvinyl chloride plate or the like, and the soft X-ray poses no danger to human bodies and presents no problem even from the aspect of safety supervision.

Thin film coating apparatuses of the present invention using a photoresist as thin film is described below with reference to drawings.

DETAILED DESCRIPTION OF THE INVENTION

Figure 1:
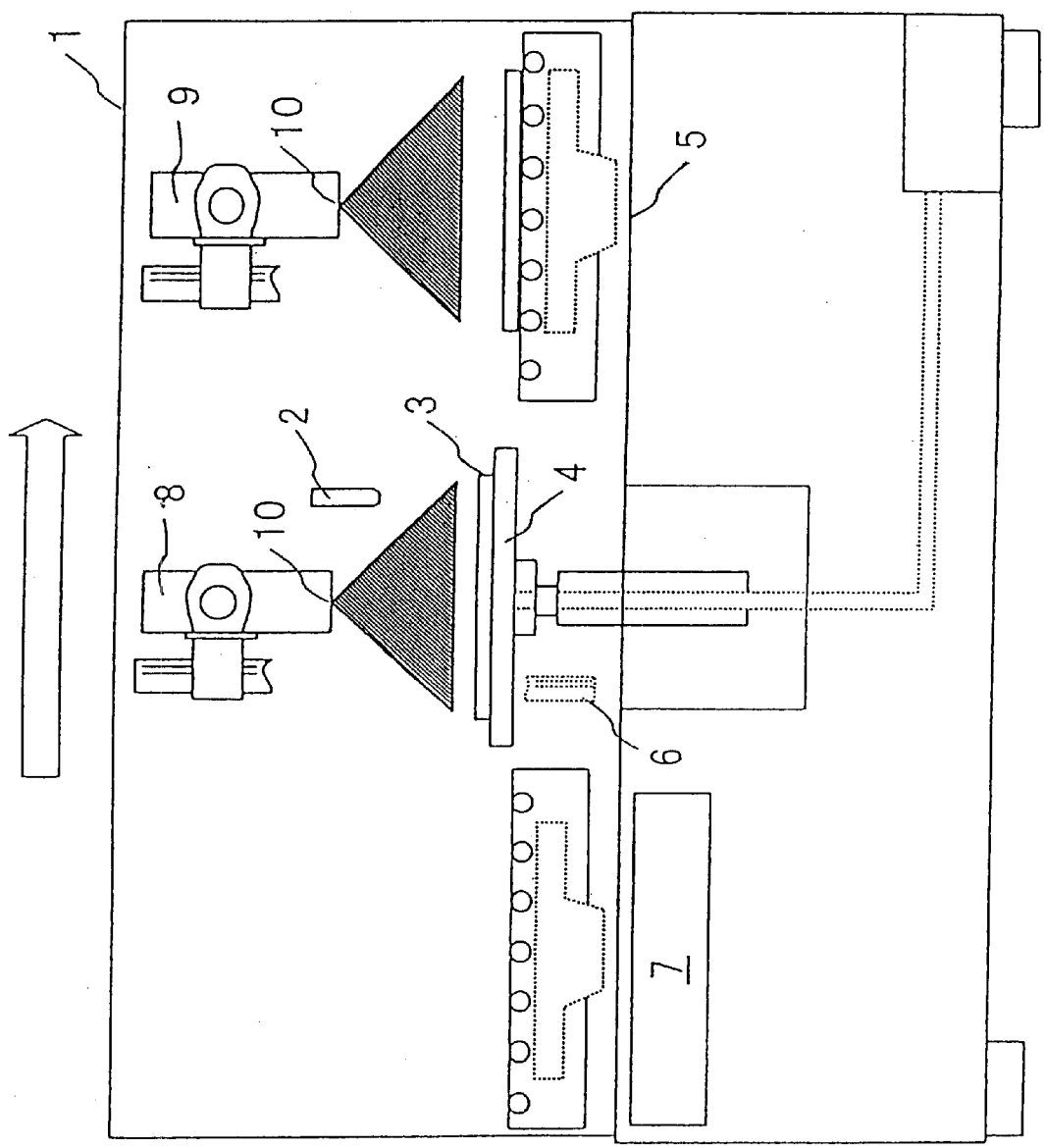
FIG. 1 is a front view of an example of the photoresist coating apparatuses of the present invention.
Figure 2:
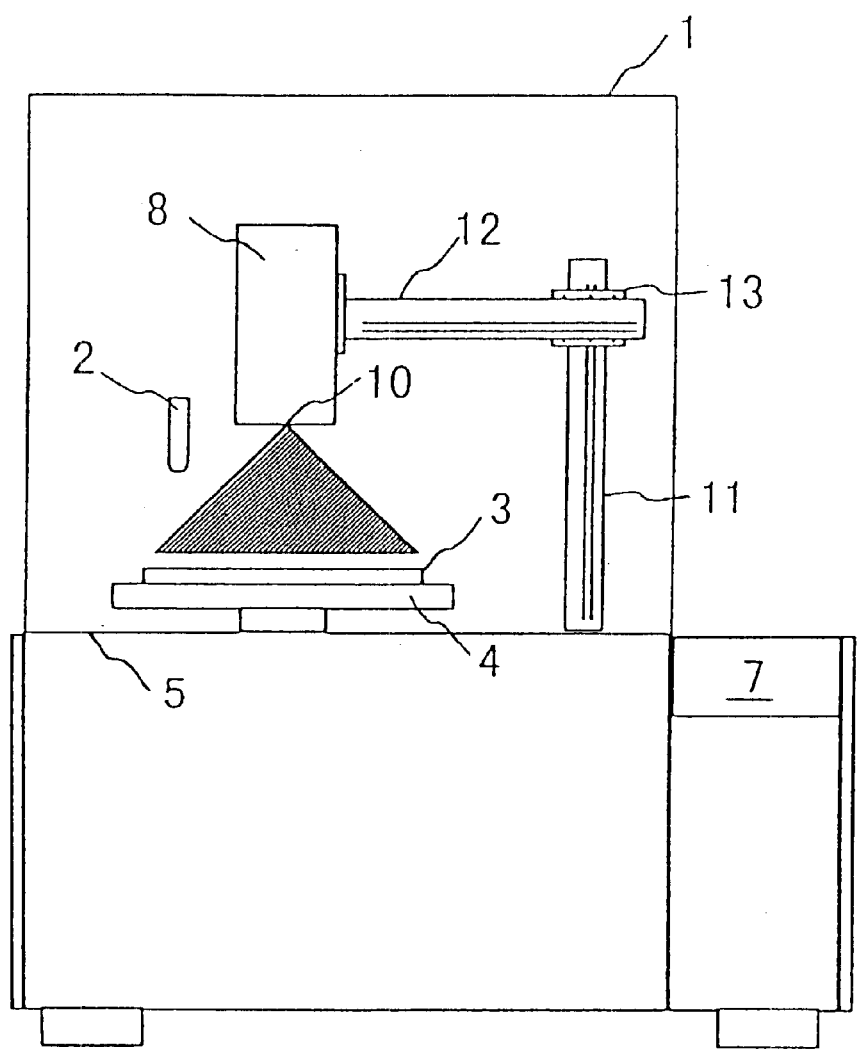
FIG. 2 is a side view of an example of the photoresist coating apparatuses of the present invention.
Figure 3:
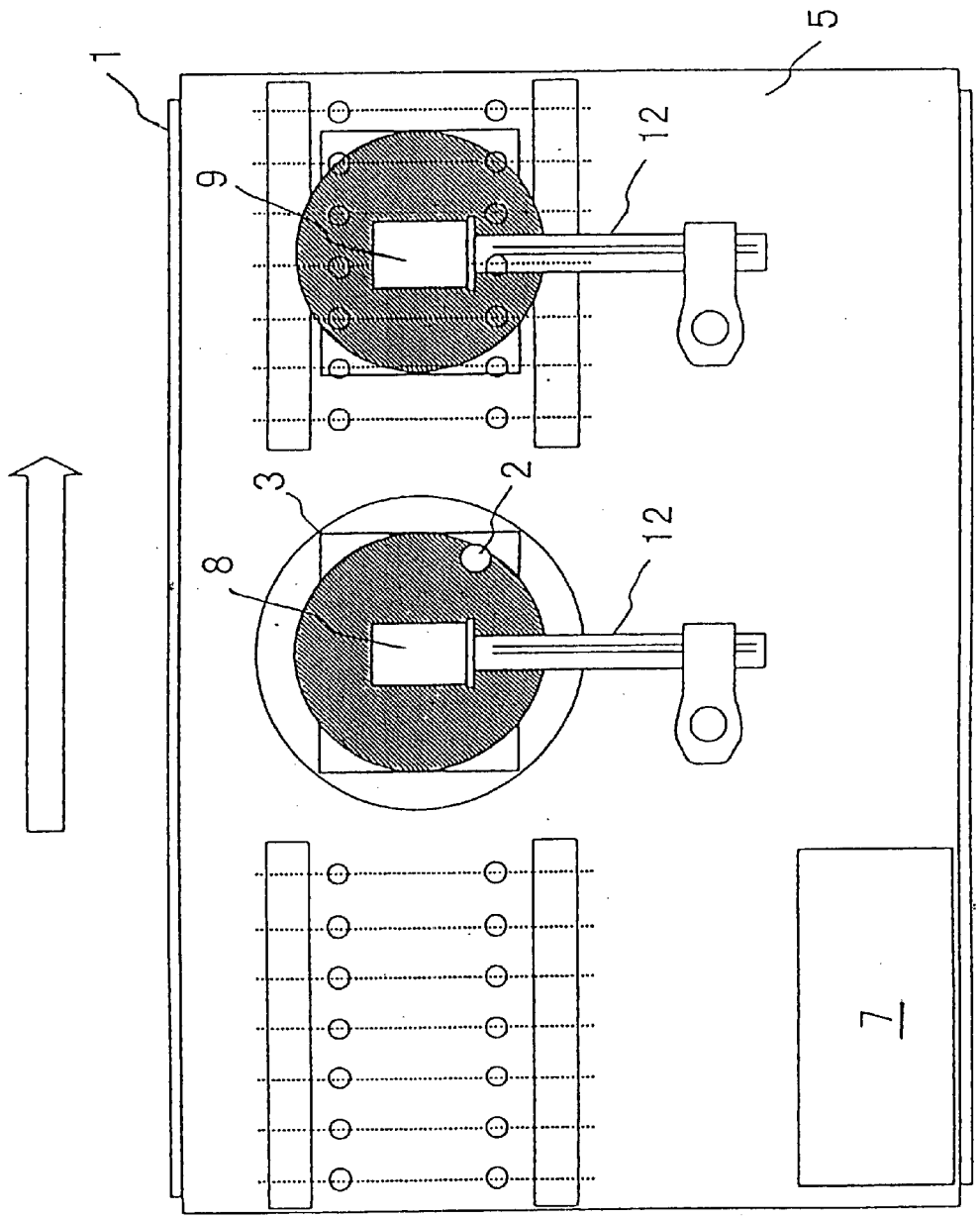
FIG. 3 is a top plan view of an example of the photoresist coating apparatuses of the present invention.

FIGS. 1, 2, and 3 are a front view, side view, and plan view, respectively, of a photoresist coating apparatus showing an embodiment of the present invention.

Photoresist coating apparatus 1 is composed principally of a transparent substrate 3 made of glass or the like and placed on the surface of a rotatable stage 4; a dispenser 2 for allowing a solution of a photoresist to fall in drops on the surface of the transparent substrate 3; a freely projectable push up pin 6 included in the stage 4 mentioned above and capable of forcing up one side of the transparent substrate 3 to facilitate removal of the transparent substrate 3 from the stage 4; and apparatuses 8 and 9 for irradiating a soft X-ray on the surface of the substrate. In the Figures, 5 is a pedestal, 10 is an irradiating window of a soft X-ray, 12 is a supporting rod of the apparatus 8, and 13 is a metal coupler, for the supporting rod provided on the column 11.

In the formation described above, when a start button (not shown in the drawings) in operating section 7 is pushed, a predetermined amount of a solution of a photoresist falls in drops from the dispenser 2 on the surface of the transparent glass substrate 3 which is set on the stage 4 by vacuum adsorption and has a transparent electrode formed thereon, and the stage 4 rotates at a predetermined rotational speed, thereby the solution of photoresist is coated on the whole surface of the substrate.

While two soft X-ray irradiating apparatuses are provided in the photoresist coating apparatus shown in the drawings, the first soft X-ray irradiating 8 is to irradiate a transparent substrate on stage 4 in a location where a photoresist coating treatment is actually performed, in other words, during a photoresist coating treatment, and the second soft X-ray irradiating apparatus 9 is to irradiate the transparent substrate 3 on the stage 4 in a location (right hand side in FIG. 1) of preparation or waiting before or after coating treatment, in other words, prior to or subsequent to the coating treatment. Irradiation range (diagonally shaded area) of soft X-ray irradiating apparatuses 8 and 9 is adjusted so the soft X-ray is radiated from irradiating window 10 to all directions in a cone shape at an angle of 110° (θ). Irradiation intensity increases in inverse proportion to the square of distance, and thus, when the irradiation intensity at the center portion and an end portion of the irradiation range are compared, the end portion is small by 20% in terms of the intensity. Accordingly, either soft X-ray irradiating apparatus is installed so that they can be placed over pedestal 5 at an optional height and optional angle. Specifically, soft X-ray irradiating apparatus 8 is rigidly supported over pedestal 5 for example, with column 11 installable at an optional location on pedestal 5, supporting rod 12 disposable in a direction vertical to column 11, and metal coupler 13 in a form of a clamp which can firmly connects both of the column and rod in a relatively movable way.

Further, the soft X-ray irradiating apparatuses used in the present invention can be used with being loaded on an offset printing type photoresist coating apparatus, insulating film coating apparatus, or alignment film coating apparatus provided with (a) a cylindrical printing roller which is held in parallel to the surface of a transparent substrate having a predetermined electrode formed on one side thereof and at a changeable distance from the surface of the printing roller, and (b) a driving means for moving the printing roller relatively to the transparent substrate in a predetermined direction while rotating the roller.

Figure 4:
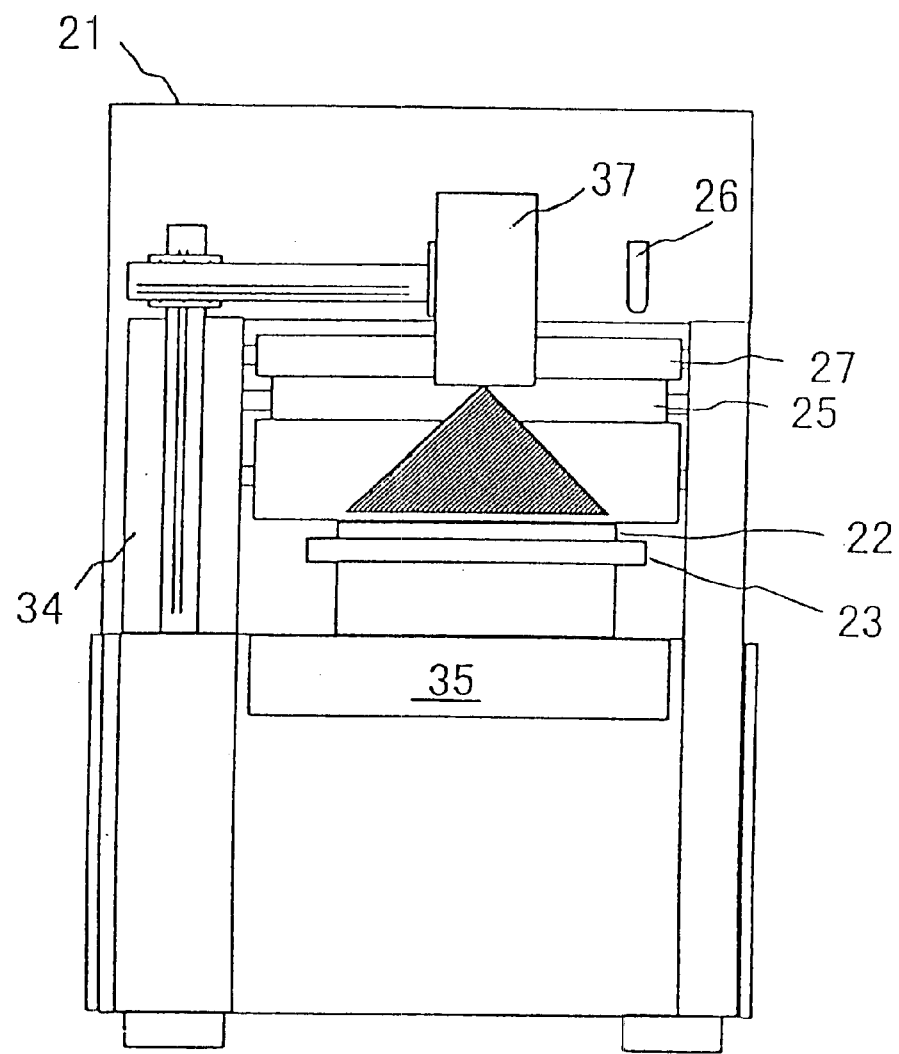
FIG. 4 is a front view of an example of the alignment film coating apparatus of the present invention.
Figure 5:
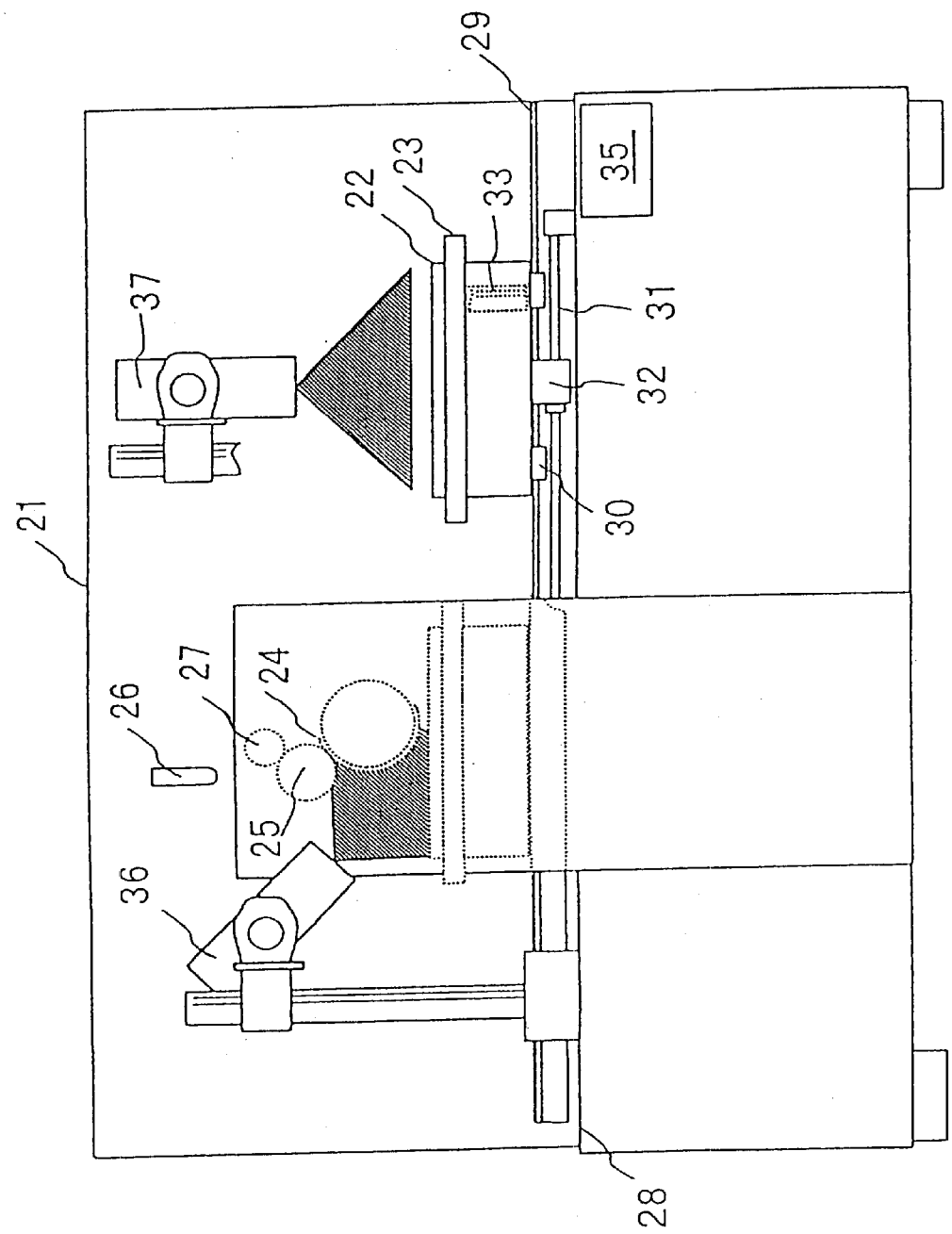
FIG. 5 is a side view of an example of the alignment film coating apparatus of the present invention.
Figure 6:
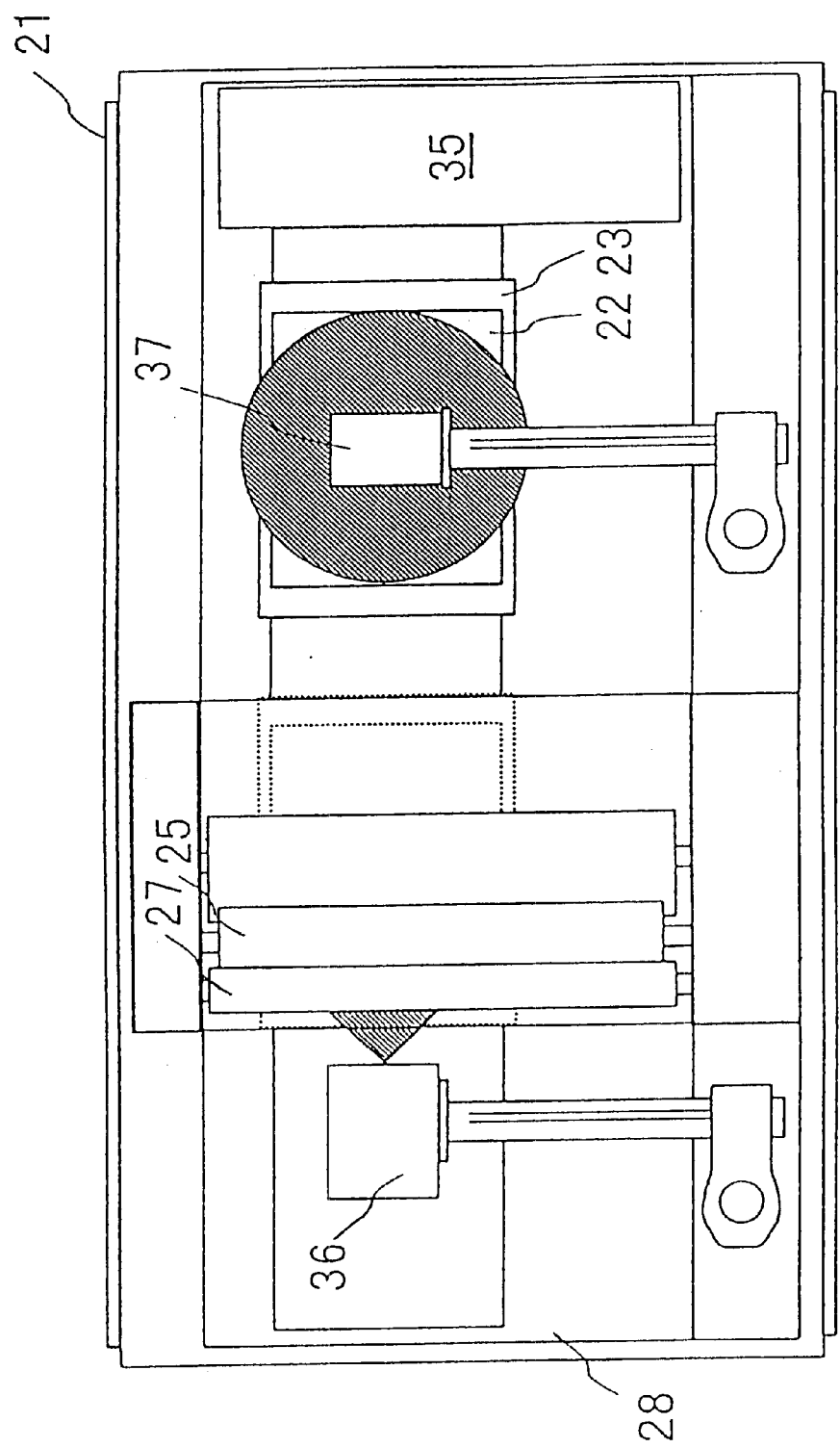
FIG. 6 is a plan view of an example of the alignment film coating apparatus of the present invention.

FIGS. 4, 5, and 6 are a front view, side view, and plan view, respectively, of an alignment film coating apparatus showing another embodiment of the present invention.

Alignment film coating apparatus 21 is principally composed of a transparent substrate 22 such as glass or the like having a predetermined electrode formed on one side thereof; a movable stage 23 on which the substrate 22 id placed; a rotatable cylindrical printing roller 24 which is horizontally supported in a movable way so that it can contact the transparent substrate 22 placed on the movable stage 23, and have a relief wound round the outer circumferential surface thereof; anirox roller 25 for transferring solution for forming an alignment film on the surface of the relief, a dispenser 26 for discharging a solution for forming an alignment film in drops; and a doctor roller 27 for leveling the discharged solution for the alignment film.

Stage 23 is supported in such a way that it is movable to and fro direction (left and right direction in FIG. 5), by the so-called linearly guiding mechanism comprising a pair of rails 29 fixed in parallel on pedestal 28 and supporting member 30 slidably fitted thereto, and is driven with a servomotor (not shown in the drawings) through the so-called straight driving mechanism consisting of a ball nut 31 arranged between both rails 29 and a nut member 32 to be screwed with the ball nut. On the top surface of stage 23, freely pushable push up pin 33 capable of forcing up one side of the transparent substrate 22 is included to facilitate removal of the substrate 22 from the stage 23. Cylindrical printing roller 24 is rotated with a motor and supported with column portion 34 (pedestal 28) so that it can be moved upward and downward direction in parallel.

Based on the formation described above, when a start button (not shown in the drawings) in operation section 35 is pushed, cylindrical printing roller 24 rotates at a predetermined speed and descends by a predetermined distance, and stage 23 moves at a predetermined speed, thereby an alignment film coating is conducted on the surface of transparent glass substrate 22 which is held on stage 23 by vacuum adsorption and has a transparent electrode formed thereon.

While two soft X-ray irradiating apparatuses (36 and 37) can be installed even in the alignment film coating apparatuses of the present invention, the first soft X-ray irradiating apparatus 36 is provided to irradiate transparent substrate 22 on stage 23 in a location where alignment film coating is actually carried out, in other words, during alignment film coating treatment, and the second soft X-ray irradiating apparatus 37 is provided to irradiate transparent substrate 22 on stage 23 when the stage 23 is situated in a location for preparation or waiting (right end in FIG. 5) after coating treatment, in other words, after alignment film coating treatment.

As described above, while the soft X-ray irradiating apparatuses used in the present invention can be used with being loaded on a photoresist coating apparatus, insulating film coating apparatus, or alignment film coating apparatus in the steps for producing liquid crystal display devices, the apparatuses of the present invention can be applied to any of apparatuses so far as they are such apparatuses as photoresist coating apparatuses and insulating film coating apparatuses, used in the steps for producing semiconductors, in which generation of static electricity becomes a problem, in addition to the apparatuses mentioned above.

A method for producing liquid crystal display devices of the present invention comprises a step for forming a transparent electrode and a circuit element of semiconductor on the surface of a pair of transparent substrates, a step for applying a photoresist on the surface of the substrates according to a predetermined pattern, a step for exposing the photoresist applied on the substrates to the light, a step for subjecting the substrates to an etching treatment, a step for releasing the photoresist from the substrates, a step for inspecting the transparent electrodes and circuit elements of semiconductor, a step for forming an insulating film on the substrates, a step for forming an alignment film on the substrates, a step for rubbing the alignment film formed on the substrate, a step for spreading spacers on the substrate, a step for applying a sealing agent on the substrate, a step for piling up the substrates, a step for providing a gap of a predetermined thickness between the substrates, a step for cutting the substrates into a predetermined size of substrates, a step for filling a liquid crystal material in the gap, a step for pasting a polarizing plate to the substrate, and a step for connecting a driver IC to the transparent electrodes described above, and the method is characterized by irradiating a soft X-ray to the substrate in a gas in at least one step prior to the rubbing treatment described above.

Soft X-ray irradiating apparatuses used in the method for producing liquid crystal display devices of the present invention can be loaded on various apparatuses. That is, the X-ray irradiating apparatuses can be used with being loaded on thin film forming apparatuses by which a transparent electrode and a semiconductor circuit element are formed on a transparent substrate by a process of sputtering, plasma CVD, or vacuum deposition; photoresist coating apparatuses; proximity type, lens projection type, or mirror projection type photoresist exposing apparatuses; etching apparatuses employed for chemical dry etching using gas plasma or employed for wet etching using hydrochloric acid, nitric acid, hydrofluoric acid, or the like; photoresist releasing apparatuses employed for chemical releasing process using a strong alkali or employed for oxygen plasma ashing process; inspecting apparatuses for transparent electrodes or semiconductor circuit elements; insulating film coating apparatuses; and alignment film coating apparatuses. These soft X-ray irradiating apparatuses are not specifically restricted so far as they can generally be used in the steps prior to subjecting liquid crystal display devices to rubbing treatment.

In the present invention, polyimide resins are preferably used as material for forming the alignment films. As the polyimides, the materials prepared by using, as their precursor, a polyamic acid having the structural unit expressed by the general formula (1)

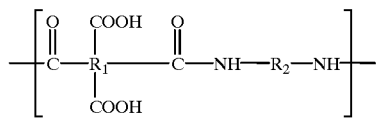

(1)

wherein $R_1$ represents a tetra-valent alicyclic, aromatic, or heterocyclic hydrocarbon residue which may have a group such as a halogen therein, and $R_2$ represents a di-valent hydrocarbon residue which may have —O—, —S—, a halogen atom, or cyano group therein, can be used.

That is, as the polyamic acid, those obtained by reacting a diamino compound with tetracarboxylic acid dianhydrides having an aromatic ring such as pyromellitic acid dianhydride, or an alicyclic dianhydride such as cyclobutane acid, and the likes are preferably used.

As the tetracarboxylic acid dianhydride, aromatic tetracarboxylic acid dianhydrides such as pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 3,3',4,4'-benzophenone-tetracarboxylic acid dianhydride, 2,3,3',4'-benzophenonetetracarboxylic acid dianhydride, 2,2',3,3'-benzophenonetetracarboxylic acid dianhydride, bis (3,4-dicarboxyphenyl)sulfonic acid dianhydride, 1,2,5,6-naphthalenetetracarboxylic acid dianhydride, and 2,3,6,7-naphthalenetetracarboxylic acid dianhydride can be mentioned, and as alicyclic tetracarboxylic acids, dianhydride of alicyclic tetracarboxylic acids having a ring such as cyclobutane, cyclohexane, cyclooctane, and bicyclooctane, and compounds having one of the following structural formulas

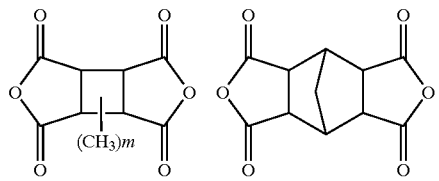

wherein m is an integer of 1 to 4

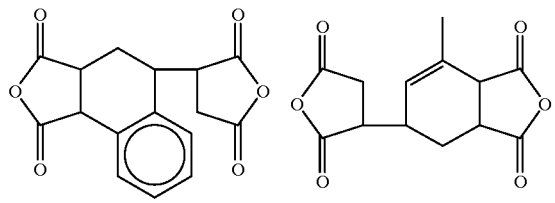

can be mentioned.

As the diamino compounds which are the other side of starting materials of the polyamic acids, aromatic diamino compounds such as
1,1-bis[4-(4-aminophenoxy)phenyl]cyclohexane,
1,1-bis[4-(4-aminophenoxy)phenyl]-4-methylcyclohexane,
1,1-bis[4-(4-aminophenoxy)phenyl]-4-ethylcyclohexane,
1,1-bis[4-(4-aminophenoxy)phenyl]-4-propylcyclohexane,
1,1-bis[4-(4-aminophenoxy)phenyl]-4-butylcyclohexane,
1,1-bis[4-(4-aminophenoxy)phenyl]-4-pentylcyclohexane,
1,1-bis[4-(4-aminophenoxy)phenyl]-4-hexylcyclohexane,
1,1-bis[4-(4-aminophenoxy)phenyl]-4-heptylcyclohexane,
1,1-bis[4-(4-aminophenoxy)phenyl]-4-octylcyclohexane,
2,2-bis[4-(4-aminophenoxy)phenyl]propane,
2,2-bis[4-(4-aminophenoxy)phenyl]butane,
2,2-bis[4-(4-aminophenoxy)phenyl]pentane,
2,2-bis[4-(4-aminophenoxy)phenyl]hexane,
2,2-bis[4-(4-aminophenoxy)phenyl]heptane,
2,2-bis[4-(4-aminophenoxy)phenyl]octane,
2,2-bis[4-(4-aminophenoxy)phenyl]nonane,
2,2-bis[4-(4-aminophenoxy)phenyl]decane,
2,2-bis[4-(4-aminophenoxy)phenyl]dodecane,
1,1-bis[4-(4-aminobenzyl)phenyl]cyclohexane,
1,1-bis[4-(4-aminobenzyl)phenyl]-4-methylcyclohexane,
1,1-bis[4-(4-aminobenzyl)phenyl]-4-ethylcyclohexane,
1,1-bis[4-(4-aminobenzyl)phenyl]-4-propylcyclohexane,
1,1-bis[4-(4-aminobenzyl)phenyl]-4-butylcyclohexane,
1,1-bis[4-(4-aminobenzyl)phenyl]-4-pentylcyclohexane,
1,1-bis[4-(4-aminobenzyl)phenyl]methane,
4,4'-diaminophenyl ether,
4,4'-diaminodiphenylmethane,
4,4'-diaminodiphenylsulfone,
4,4'-diaminodiphenylsulfide,
4,4'-di(meta-aminophenoxy)diphenylsulfone,
4,4'-di(para-aminophenoxy)diphenylsulfone,
ortho-phenylenediamine,
meta-phenylenediamine,
para-phenylenediamine,
benzidine,
2,2'-diaminobenzophenone,
4,4'-diaminobenzophenone,
4,4'-diaminodiphenyl-2,2'-propane,
1,5-diaminonaphthalene,
1,8-diaminonaphthalene, and
2,2-bis[4-(4-aminophenoxy)phenyl]hexamethylpropane, and alicyclic diamino compounds such as 1,4-diaminocyclohexane and 4,4'-diaminodicyclohexylmethane can be mentioned.

However, tetracarboxylic acid dianhydrides and diamino compounds which are starting materials of alignment films used in the present invention are not restricted to those compounds mentioned above. Further, the acid anhydrides and diamino compounds can be used in combination of two or more thereof.

In order to form an alignment film of the present invention on a substrate, a method is generally used in which a polyamic acid which is a precursor of polyimide compounds and can be obtained by condensation of a tetracarboxylic acid dianhydride with a diamino compound is dissolved in a solvent and then the solution is applied on a substrate and heated to form an imide since the polyimide compounds are insoluble in solvents. Specifically, a polyamic acid is dissolved in a solvent such as N-methyl-2-pyrrolidone (NMP), dimethyl acetamide (DMAc), dimethyl formamide (DMF), dimethyl sulfoxide (DMSO), butyl cellosolve (BC), ethyl carbitol, propylene glycol monobutyl ether, and 3-methyl-3-methoxybutanol to prepare a polyamic acid solution having a concentration of 0.1 to 30% by weight, preferably 1 to 10% by weight, and the solution is applied on a substrate by a brushing method, dipping method, rotational coating method, spraying method, printing method, or the like to form a coated film on the substrate. After formation of a film, the solvent is evaporated off at a temperature of 50 to 150° C., preferably 80 to 120° C., and then the film is heated at a temperature of 150 to 400° C., preferably 180 to 280° C. to perform dehydrocyclization reaction thereby to form a liquid crystal alignment film comprising a polybenzyl imide type polymer.

In the case where the adhesion of the polymer film thus obtained to the substrate is not good, the adhesion can be improved by subjecting the surface of the substrate with a silane coupling agent in advance and then forming the polymer film. Alignment films for liquid crystals can be obtained by forming a film of an organic polymer on the surface of a substrate by such a method as described above, and then rubbing the surface of the film with a cloth in a certain prescribed direction.

As the liquid crystal materials used in the liquid crystal display devices of the present invention, any materials can be used so far as the materials are liquid crystals having a dichroic dye added therein, ferroelectric liquid crystals, antiferroelectric liquid crystals, or other liquid crystals which can be used for ordinary display devices, in addition to ordinary nematic liquid crystals.

As the component of the liquid crystals which can be used in the present invention, liquid crystal compounds expressed by the following general formula (2) or (3)

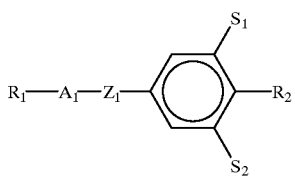
(2)

wherein $R_1$ represents a straight chain alkyl group having 1 to 10 carbon atoms or an alkenyl group having 2 to 10 carbon atoms; $R_2$ represents a straight chain alkyl group or alkyloxy group having 1 to 10 carbon atoms, —CN, fluorine atom, chlorine atom, —CF$_3$, —CHF$_2$, —OCF$_3$, or —OCHF$_2$; $S_1$ and $S_2$ represent hydrogen atom, fluorine atom, chlorine atom, —CF$_3$, —CHF$_2$, —OCF$_3$, or —OCHF$_2$, and these atoms or groups may be the same or different; $Z_1$ represents —COO—, —CH$_2$CH$_2$—, —C≡C—, or single bond; $A_1$ represents

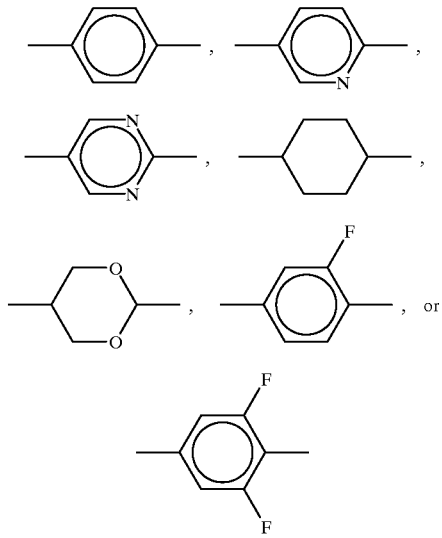

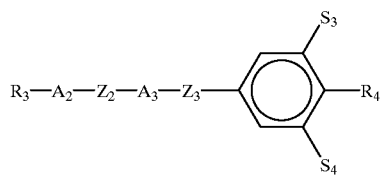
(3)

wherein $R_3$ has the same meaning as $R_1$ in the general formula (2); $R_4$ has the same meaning as $R_2$ in the general (2); $S_3$ and $S_4$ have the same meaning as $S_1$ and $S_2$ in the general formula (2), and they may be the same or different; $Z_2$ and $Z_3$ may be the same or different, and have the same meaning as $Z_1$ in the general formula (2); $A_2$ and $A_3$ have the same meaning as $A_1$ in the general formula (2), and they may be the same or different, can be mentioned as their examples.

While these liquid crystal compositions may be composed of a single component or a mixture of a plural number of components, compositions comprising a plural number of compounds are preferable. Further, other compounds than those described above can be mixed to the liquid crystal mixtures used in the liquid crystal display devices of the present invention so far as the purposes of the invention are not frustrated.

Now, the present invention will be described in more detail with reference to Examples and Comparative Examples. However, it should be understood that the scope of the present invention is by no means restricted by such specific Examples and Comparative Examples.

EXAMPLE 1

Photoresist (trade name: OFPR-800) produced by Tokyo Ohka Kogyo Co., Ltd. was applied on the surface of a transparent glass substrate provided with an ITO electrode on one side thereof, by using a spin coat type photoresist coating apparatus loaded with a soft X-ray irradiating apparatus (type L7120) produced by Hamamatsu Photonics Co., Ltd., at an initial revolution number of 500 rpm for 3 seconds, middle revolution number of 2000 for 5 seconds, and last revolution number of 3000 rpm for 0.5 second. At this time, it was confirmed that the static of about 5 kV on the surface of the substrate generated during conveyance or other operations of the glass substrate prior to its fitting to the spinner (photoresist coating apparatus) became lower than 100V by irradiation of a soft X-ray for 5 seconds. Energy of the soft X-ray irradiating apparatus was 6 keV, and its tube voltage and tube current were 9.5 kV and 150 μA, respectively. After finishing of application of the photoresist, pre-baking at 90° C. was conducted for 30 minutes in a clean oven to obtain a photoresist film of a thickness of 1.4 μm.

This substrate was subjected to a proximity exposure for 3 seconds with an exposing apparatus of 15.6 mW/cm$^2$ (405 nm), subjected to a dip development with a developer (trade name: NMD-3: 2.38%) produced by Tokyo Ohka Kogyo Co., Ltd. for 60 seconds, rinsed with ultra-pure water for 30 seconds, and then subjected to a post-baking in a clean oven at 135° C. for 20 minutes. This substrate was subjected to an etching treatment with an acid of FeCl$_3$+HCl and treated with release liquid (trade name: 502A) produced by Tokyo Ohka Kogyo Co., Ltd. to release the photoresist. After finishing of the releasing, the substrate was rinsed with ultra-pure water, dried, and inspected for shorts and opens in the ITO pattern. As the result, it was found out that percent defective of the ITO pattern was reduced by 10% by irradiating the soft X-ray to the substrate to remove the static thereby decrease the amount of dusts adsorbed thereto, compared with conventional methods wherein a soft X-ray is not irradiated.

EXAMPLE 2

Insulating liquid (trade name: LIXON COAT PMA-801P) produced by Chisso Corporation for forming an insulating film was applied on the surface of a transparent glass substrate provided with an ITO electrode on one side thereof, by using a spin coat type insulating film coating apparatus loaded with a soft X-ray irradiating apparatus (type L7120) produced by Hamamatsu Photonics Co., Ltd., while rotating it at a revolution number of 1000 rpm for 20 seconds. It was confirmed that the static of 10 kV at maximum generated at this time became lower than 100V by irradiation of the soft X-ray.

Energy of the soft X-ray irradiating apparatus was 6 keV, and its tube voltage and tube current were 9.5 kV and 150 μA, respectively. After finishing of application of the insulating liquid, it was dried at 100° C. for 3 minutes and then heat treated in an air oven at 200° C. for 30 minutes to obtain a cured film.

On the surface of this substrate, an aligning film liquid (liquid for forming aligning film) (trade name: LIXON ALIGNER PIA-2424) produced by Chisso Corporation for forming an alignment film for STN was applied by using an offset printing type alignment film coating apparatus. After finishing of application of the aligning film liquid, it was dried at 100° C. for 10 minutes, raised up to 200° C. in an air oven in 1 hour, and then heat treated at 200° C. for 90 minutes to obtain a polyimide film having a thickness of about 600 Å on the substrate provided with a transparent electrode.

After the transparent glass substrate thus obtained having the polyimide film formed thereon was subjected to a rubbing, spacers of 6 μm were spread by using a wet type spacer spreading apparatus. A sealing agent was applied on the surface of the other substrate on which spacers were not spread. Then, two of the substrates were stuck together to fabricate a liquid crystal cell in which twist angle was adjusted to 240°. After a liquid crystal (trade name: LIXON 4032-000XX) for STN produced by Chisso Corporation was filled in the cell thus obtained, it was subjected to an isotropic treatment at 120° C. for 30 minutes, and then gradually cooled down to room temperature to obtain a liquid crystal display device.

In the same manner as described above, 10 pieces of substrate were prepared and electric current was passed through the devices thus obtained for inspecting the presence or absence of uneven display to find out that whereas slightly uneven display was observed with 3 pieces of the substrate, uneven display was not noticed with remaining 7 pieces of the substrate.

EXAMPLE 3

Insulating liquid (trade name: LIXON COAT PMA-801P) produced by Chisso Corporation for forming an insulating film was applied on the surface of a transparent glass substrate provided with an ITO electrode on one side thereof, by using a spin coat type insulating film coating apparatus while rotating it at a revolution number of 1000 rpm for 20 seconds. After finishing of application of the insulating liquid, it was dried at 100° C. for 3 minutes and then heat treated in an air oven at 200° C. for 30 minutes to obtain a cured film.

On the surface of this substrate, an aligning film liquid (trade name: LIXON ALIGNER PIA-2424) produced by Chisso Corporation for forming an alignment film for STN was applied by using an offset printing type alignment film coating apparatus loaded with a soft X-ray irradiating apparatus (type L7120) produced by Hamamatsu Photonics Co., Ltd. It was confirmed that the static of 10 kV at maximum generated at this time became lower than 100V by irradiation of the soft X-ray. Energy of the soft X-ray irradiating apparatus was 6 keV, and its tube voltage and tube current were 9.5 kV and 150 μA, respectively. After finishing of application of the aligning film liquid, it was dried at 100° C. for 10 minutes, raised up to 200° C. in an air oven in 1 hour, and then heat treated at 200° C. for 90 minutes to obtain a polyimide film having a thickness of about 600 Å on the substrate provided with a transparent electrode.

After the transparent glass substrate thus obtained having the polyimide film formed thereon was subjected to a rubbing, spacers of 6 μm were spread by using a wet type spacer spreading apparatus. A sealing agent was applied on the surface of the other substrate on which a spacers were not spread. Then, two of the substrates were stuck together to fabricate a liquid crystal cell in which twist angle was adjusted to 240°. After a liquid crystal (trade name: LIXON 4032-000XX) for STN produced by Chisso Corporation was filled in the cell thus obtained, it was subjected to an isotropic treatment at 120° C. for 30 minutes, and then gradually cooled down to room temperature to obtain a liquid crystal display device.

In the same manner as described above, 10 pieces of substrate were prepared and electric current was passed through the devices thus obtained for inspecting the presence or absence of uneven display to find out that whereas slightly uneven display was observed with 3 pieces of the substrate, uneven display was not noticed with remaining 7 pieces of the substrate.

Comparative Example 1

Ten pieces of liquid crystal display device were prepared in the same manner as in Example 2 with the exception that the soft X-ray irradiation was not carried out.

Electric current was passed through 10 pieces of the substrate thus obtained for inspecting the presence or absence of uneven display to find out that uneven display was observed in every device, and remarkable uneven display was noticed in 7 pieces of the substrate.

Comparative Example 2

Ten pieces of liquid crystal display device were prepared in the same manner as in Example 3 with the exception that the soft X-ray irradiation was not carried out.

Electric current was passed through 10 pieces of the substrate thus obtained for inspecting the presence or absence of uneven display to find out that uneven display was observed in every device, and remarkable uneven display was noticed in 7 pieces of the substrate.

According to the thin film coating apparatuses of the present invention, the static generated at thin film coating step can readily and efficiently be eliminated. According to the method for producing liquid crystal display devices of the present invention, it is possible to eliminate static and to reduce uneven displays and pixel defects by irradiating a soft X-ray in the gas in a production step prior to a rubbing treatment of a liquid crystal display device, thereby to improve display quality of liquid crystal display devices and to increase the yield of products.

Industrial Applicability

The present invention is preferably used in photoresist coating apparatuses, insulating film coating apparatuses, alignment film coating apparatuses in which adhesion of particles to substrates with static is prevented; and preferably used in the methods for producing liquid crystal display devices.

What is claimed is:

1. In a method for producing a liquid crystal display device, the method comprising:
    forming a transparent electrode and a circuit element of semiconductor on a surface of a pair of transparent substrates
    applying a photoresist on the surface of the substrates according to a predetermined pattern;
    exposing the photoresist applied on the substrates to a light;
    subjecting the substrates to an etching treatment;
    releasing the photoresist from the substrates;
    inspecting the transparent electrodes and circuit elements of the semiconductor;
    forming an insulating film on the substrates;
    forming an alignment film on the substrates;
    rubbing the alignment film formed on the substrates;
    spreading spacers on the substrates;
    applying a sealing agent on the substrates;
    piling up the substrates;
    providing a gap of predetermined thickness between the substrates;
    cutting the substrates into a predetermined size;
    filling a liquid crystal material in the gap;
    pasting a polarizing plate to the substrate;
    connecting a driver IC to the transparent electrodes;
    irradiating a soft X-ray to the substrates in a gas in the step of applying a photoresist on the substrates, the step of forming an insulating film on the substrates, or the step of forming an alignment film on the substrates.

2. The method for producing a liquid crystal display device according to claim 1 wherein the irradiating energy of the soft X-ray is 4 to 9.5 keV.

3. The method for producing a liquid crystal display device according to claim 1, wherein the distance from the substrate to the source of the soft X-ray is shorter than 1500 mm.

4. A liquid crystal display device produced by the method defined in claim 1.

5. The liquid crystal display device according to claim 4 wherein the liquid crystal material is a mixture comprising at least one compound expressed by the general formula (2) or (3)

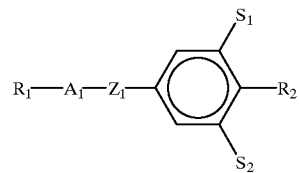

(2)

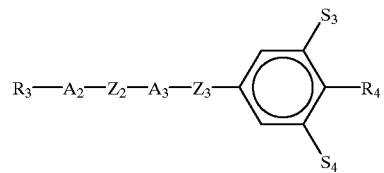

(3)

wherein $R_1$ and $R_3$ independently represent a straight chain alkyl group having 1 to 10 carbon atoms or an alkenyl group having 2 to 10 carbon atoms; $R_2$ and $R_4$ independently represent a straight chain alkyl group or alkyloxy group having 1 to 10 carbon atoms, —CN, fluorine atom, chlorine atom, —$CF_3$, —$CHF_2$, —$OCF_3$, or —$OCHF_2$; $S_1$, $S_2$, $S_3$, and $S_4$ independently represent hydrogen atom, fluorine atom, chlorine atom, —$CF_3$, —$CHF_2$, —$OCF_3$, or —$OCHF_2$; $Z_1$, $Z_2$, and $Z_3$ independently represent —COO—, —$CH_2CH_2$—, —C≡C—, or single bond; and $A_1$, $A_2$, and $A_3$ independently represent

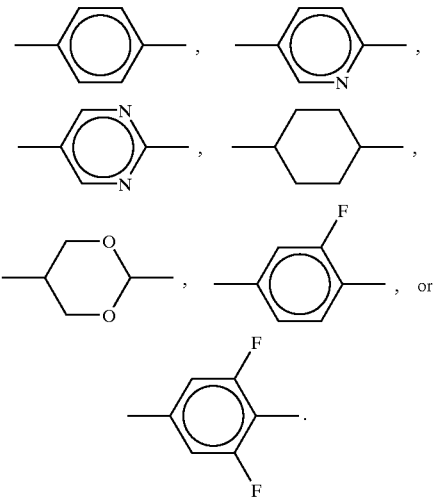

* * * * *